US011389869B2

(12) United States Patent
Segawa et al.

(10) Patent No.: US 11,389,869 B2
(45) Date of Patent: Jul. 19, 2022

(54) CYLINDER FOR MOLDING MACHINE, AND ITS PRODUCTION METHOD

(71) Applicant: HITACHI METALS, LTD., Tokyo (JP)

(72) Inventors: Takayuki Segawa, Kitakyusyu (JP); Kiyoshi Furushima, Kitakyusyu (JP)

(73) Assignee: HITACHI METALS, LTD., Tokyo (JP)

( * ) Notice: Subject to any disclaimer, the term of this patent is extended or adjusted under 35 U.S.C. 154(b) by 79 days.

(21) Appl. No.: 16/632,670

(22) PCT Filed: Aug. 31, 2018

(86) PCT No.: PCT/JP2018/032458
§ 371 (c)(1),
(2) Date: Jan. 21, 2020

(87) PCT Pub. No.: WO2019/045067
PCT Pub. Date: Mar. 7, 2019

(65) Prior Publication Data
US 2020/0222980 A1    Jul. 16, 2020

(30) Foreign Application Priority Data
Aug. 31, 2017  (JP) .............................. JP2017-167605

(51) Int. Cl.
*B22F 3/00* (2021.01)
*B22F 3/03* (2006.01)
(Continued)

(52) U.S. Cl.
CPC ................ *B22F 3/004* (2013.01); *B22F 3/03* (2013.01); *B22F 5/007* (2013.01); *B29C 33/38* (2013.01);
(Continued)

(58) Field of Classification Search
CPC .. B22F 3/004; B22F 3/03; B22F 5/007; B22F 2301/15; B22F 2302/10; B22F 2304/10; B29C 33/38
(Continued)

(56) References Cited

U.S. PATENT DOCUMENTS

| | | | | |
|---|---|---|---|---|
| 5,816,699 A | * | 10/1998 | Keith | B29C 48/682 366/84 |
| 2015/0114720 A1 | * | 4/2015 | Ferguson | C21D 1/28 175/92 |
| 2016/0184894 A1 | * | 6/2016 | Berglund | B22F 7/08 419/6 |

FOREIGN PATENT DOCUMENTS

| | | |
|---|---|---|
| JP | 61-218869 A | 9/1986 |
| JP | 62-273820 A | 11/1987 |

(Continued)

OTHER PUBLICATIONS

Industrial Heating, "Sintering/Powder Metallurgy: Hot Isostatic Pressing (HIP) Technology", Sep. 2006 (Year: 2006).*

(Continued)

*Primary Examiner* — Brian D Walck
*Assistant Examiner* — Danielle Carda
(74) *Attorney, Agent, or Firm* — Sughrue Mion, PLLC (57) ABSTRACT

A cylinder for a molding machine comprising a HIP-sintered lining layer on an inner surface of a cylindrical steel body, the lining layer comprising 38-70% by volume of tungsten carbide particles having a median diameter $d_{50}$ of 1-7 μm and a matrix composed of an Ni-based alloy, and the maximum length of the matrix in an arbitrary cross section being 12 μm or less.

4 Claims, 6 Drawing Sheets

(51) Int. Cl.
*B22F 5/00* (2006.01)
*B29C 33/38* (2006.01)

(52) U.S. Cl.
CPC ....... *B22F 2301/15* (2013.01); *B22F 2302/10* (2013.01); *B22F 2304/10* (2013.01)

(58) Field of Classification Search
USPC .......................................................... 419/8
See application file for complete search history.

(56) References Cited

FOREIGN PATENT DOCUMENTS

| | | |
|---|---|---|
| JP | 05-269813 A | 10/1993 |
| JP | 06-238725 A | 8/1994 |
| JP | 07-290186 A | 11/1995 |
| JP | 2002-161319 A | 6/2002 |
| JP | 2008-201080 A | 9/2008 |
| JP | 2009-255454 A | 11/2009 |
| JP | 2016-064417 A | 4/2016 |

OTHER PUBLICATIONS

Translation JP 2016-064417 A (Year: 2016).*
Translation JP H05-269813A (Year: 1993).*
Partial Translation of JPH05269813A (Year: 1993).*
International Search Report of PCT/JP2018/032458 dated Oct. 2, 2018 [PCT/ISA/210].

* cited by examiner

Fig. 8

CYLINDER FOR MOLDING MACHINE, AND ITS PRODUCTION METHOD

CROSS REFERENCE TO RELATED APPLICATIONS

This application is a National Stage of International Application No. PCT/JP2018/032458, filed Aug. 31, 2018, claiming priority to Japanese Patent Application No. 2017-167605, filed Aug. 31, 2017.

FIELD OF THE INVENTION

The present invention relates to a molding machine cylinder having a composite structure comprising a lining layer having excellent wear resistance, corrosion resistance and machinability, which is mainly used in injection-molding or extrusion-molding machines for plastics.

BACKGROUND OF THE INVENTION

It is required that cylinders used for machines for injection-molding or extrusion-molding plastics, etc. withstand wear by resins, additives, etc. during high-temperature molding, and can be produced at lower cost. To meet such requirements, a molding machine cylinder having a bimetal structure comprising a lining layer having tungsten carbide particles dispersed in a nickel alloy matrix, which is formed by a centrifugal casting method on an inner surface of a steel-made circular cylinder, has conventionally been used.

In recent extrusion or injection molding of reinforced plastics and flame-retardant plastics used in electronic or electric parts and automobile parts, molding machine cylinders are exposed to severe wear and corrosion. For example, because the reinforced plastics exert severe wear by their glass fibers or inorganic fillers, and the flame-retardant plastics exert severe corrosion by isolated halogens, development has been conducted to provide molding machine cylinders having lining layers formed by HIP.

JP 1-15-269813 A discloses a composite cylinder for high-temperature, high-pressure molding, which comprises a cylinder body of heat-resistant martensitic steel, and a lining layer of a Ni-based alloy containing tungsten carbide particles, the lining layer being formed by uniformly dispersing 5-60 parts by weight [2.8-25.5% by volume (converted by calculation using that the Ni-based alloy has a density of 8.9 g/cm$^3$, and the tungsten carbide has a density of 15.6 g/cm$^3$, the same is true below)] of tungsten carbide particles having particle sizes of 5-100 μm in 100 parts by weight of atomized Ni-based alloy powder having wear resistance and corrosion resistance, and pressure-sintering the lining layer on the inner surface of the cylinder body by HIP.

JP S61-218869 A discloses a cylinder having excellent wear resistance and corrosion resistance, which has a two-layer structure in which an inner layer of a sintered Ni-based alloy containing 30-95% by mass [20-92% by volume (converted)] of tungsten carbide particles is integrally fused to an inner surface of a metal cylinder as an outer layer by HIP. JP S61-218869 A describes that the tungsten carbide particles preferably have particle sizes of 1-30 μm from the aspect of surface roughening resistance.

However, even the molding machine cylinders having lining layers formed by HIP, which are described in JP H5-269813 A and JP S61-218869 A, do not have sufficient wear resistance and corrosion resistance for the molding of reinforced plastics, flame-retardant plastics, etc. Further improvements are thus desired. For example, if the percentage of tungsten carbide particles in the lining layer were increased to improve wear resistance and corrosion resistance, the lining layer would have decreased mechanical strength when exceeding 60 parts by weight [25.5% by volume (converted)] per 100 parts by weight of the Ni-based alloy, as described in the specification of JP H5-269813 A. Accordingly, it is difficult to obtain further improved wear resistance and corrosion resistance by increasing the amount of tungsten carbide particles. In addition, hard tungsten carbide particles in the lining layer necessitate long time for machining for assembling in a molding machine.

OBJECT OF THE INVENTION

Accordingly, an object of the present invention is to provide a molding machine cylinder comprising a lining layer having excellent wear resistance, corrosion resistance and machinability and suffering no deterioration of mechanical strength even when the amount of tungsten carbide particles is increased, and its production method.

SUMMARY OF THE INVENTION

In view of the above object, the inventors have conducted intensive research on a HIPed lining layer of a Ni-based alloy containing tungsten carbide particles, finding that when the structure of the lining layer is optimized, the lining layer can be provided with improved wear resistance and corrosion resistance as well as excellent machinability, without suffering the deterioration of mechanical strength even when the percentage of tungsten carbide particles is increased. The present invention has been completed based on such finding.

Thus, the molding machine cylinder of the present invention comprises a HIP-sintered lining layer formed on an inner surface of a cylindrical steel body, the lining layer comprising 38-70% by volume of tungsten carbide particles having a median diameter $d_{50}$ of 1-7 μm and a matrix composed of an Ni-based alloy, and the maximum length of the matrix in an arbitrary cross section being 12 μm or less.

The tungsten carbide particles preferably have $d_{10}$ of 0.5-3 μm and $d_{90}$ of 5-15 μm, wherein $d_{10}$ and $d_{90}$ are particle sizes at cumulative volumes corresponding to 10% and 90%, respectively, of the total volume, in a curve expressing the relation between the particle size and cumulative volume (value obtained by accumulating the volume of particles having sizes up to a particular size) of tungsten carbide particles.

The matrix composed of an Ni-based alloy preferably contains by mass 1-7% of Si, 5-20% of Cr, and 1-4% of B.

The matrix composed of an Ni-based alloy preferably contains at least one of less than 0.13% of C, 1.5% or less of Mn, 12% or less of Co, 1% or less of Fe, and 0.1% or less of Mo.

The lining layer preferably contains 45-60% by volume of the tungsten carbide particles.

The method of the present invention for producing a cylinder for a molding machine comprises the steps of arranging a steel mandrel inside a cylindrical steel body to form a space between an inner surface of the cylindrical body and the mandrel;

filling the space with a powdery mixture comprising tungsten carbide powder and Ni-based alloy powder at a volume ratio of 38/62 to 70/30;

evacuating and sealing the space containing the powdery mixture, and then subjecting the powdery mixture to HIP to obtain a composite cylinder whose cylindrical body is lined with the Ni-based alloy containing tungsten carbide particles; and machining the resultant composite cylinder;

the tungsten carbide powder having a median diameter $d_{50}$ of 1-7 μm, and $d_{50}/(d_{90}-d_{10})$ of 0.4 or more; and the Ni-based alloy powder having a median diameter $d_{50}$ of 2-8 μm, and $d_{50}/(d_{90}-d_{10})$ of 0.6 or more.

Effects of the Invention

Because the molding machine cylinder of the present invention comprises a lining layer having excellent wear resistance, corrosion resistance and machinability and suffering no deterioration of mechanical strength even when the amount of tungsten carbide particles is increased, it is suitable for injection-molding or extrusion-molding machines for plastics.

DESCRIPTION OF THE PREFERRED EMBODIMENTS

[1] Cylinder for Molding Machine

Figure 1:
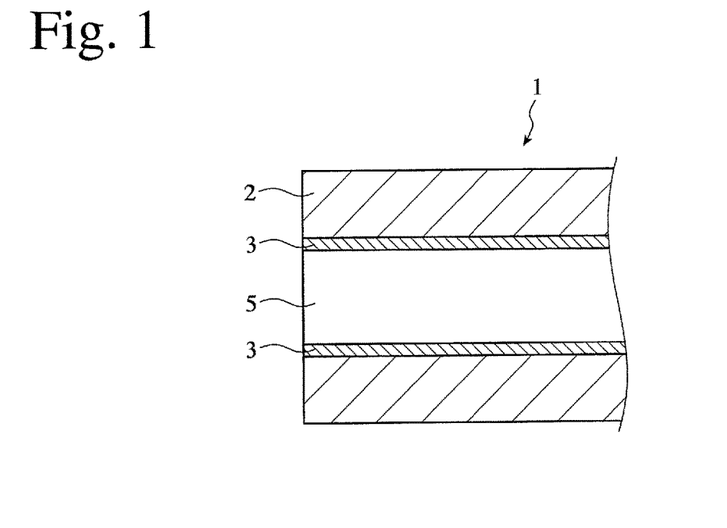
FIG. 1 is a schematic cross-sectional view showing an example of the molding machine cylinders of the present invention.
Figure 2:
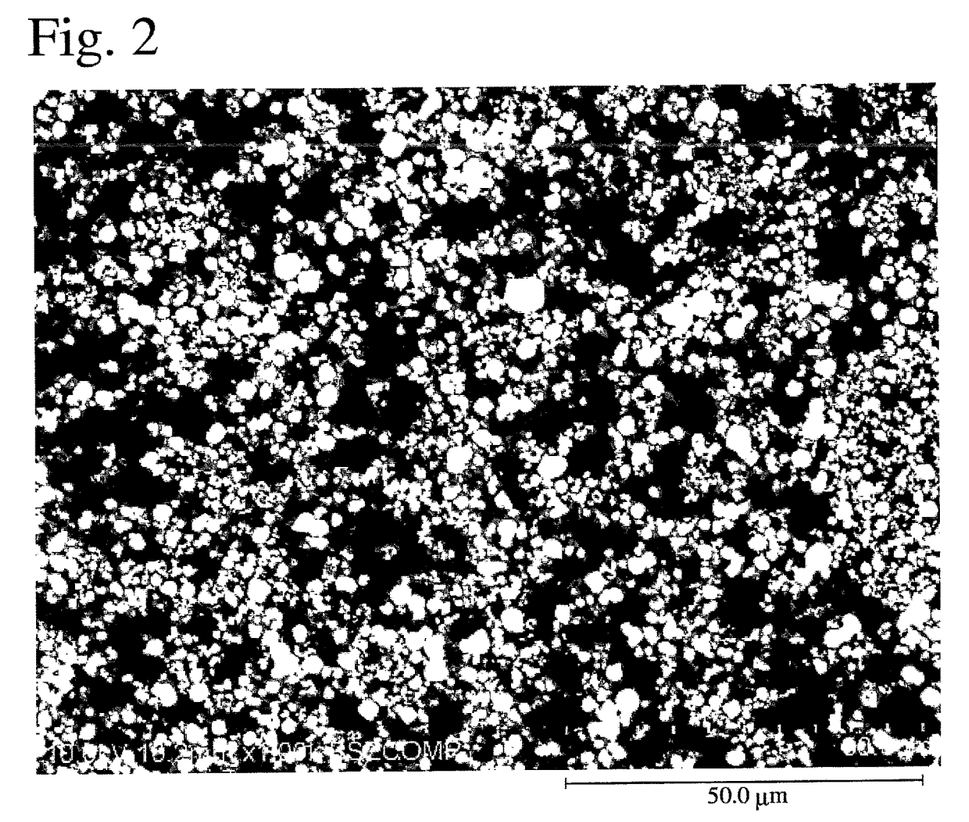
FIG. 2 is an electron photomicrograph showing a cross section of the lining layer of the molding machine cylinder of Example 1.
Figure 3:
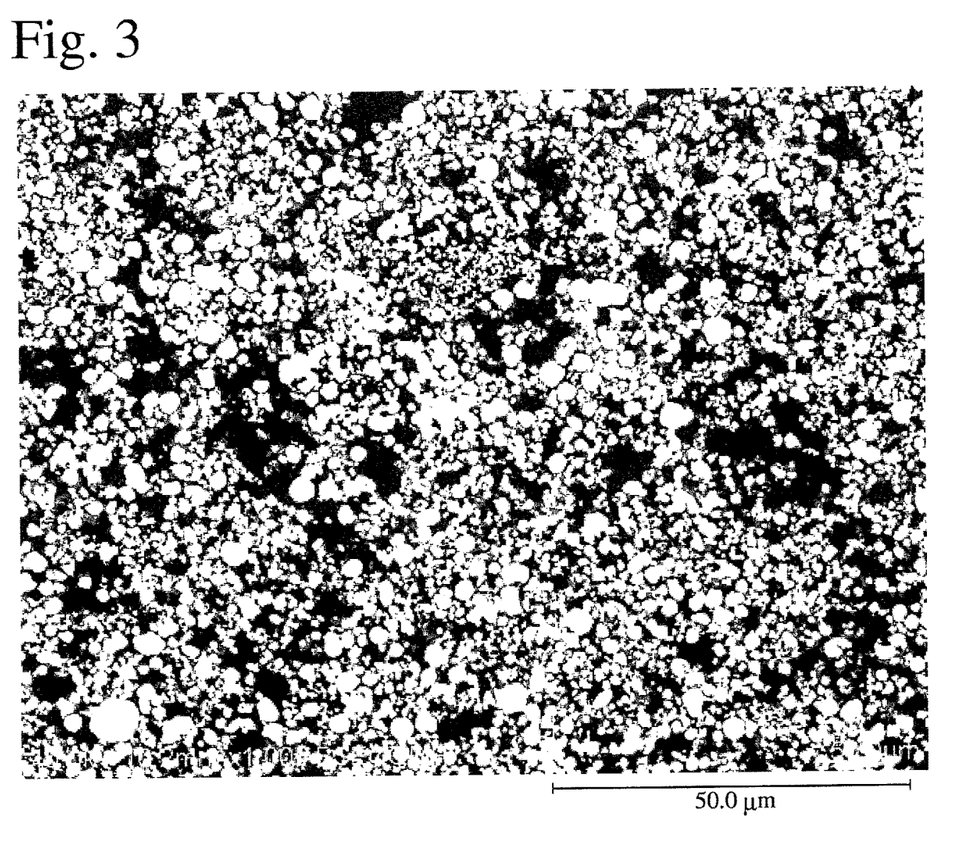
FIG. 3 is an electron photomicrograph showing a cross section of the lining layer of the molding machine cylinder of Example 2.

As shown in FIG. 1, the cylinder 1 for a molding machine according to the present invention comprises a HIP-sintered lining layer, which is simply called lining layer 3, on an inner surface of a cylindrical steel body 2, the lining layer 3 comprising 38-70% by volume of tungsten carbide particles having a median diameter $d_{50}$ of 1-7 μm and a matrix composed of an Ni-based alloy, and the maximum length of the matrix in an arbitrary cross section being 12 μm or less. The lining layer 3 is formed by sintering a powdery mixture of Ni-based alloy powder and tungsten carbide powder by a HIP process, such that it is integrally fused to an inner surface of the cylindrical body 2.

(1) Lining Layer (A) Structure

Figure 4:
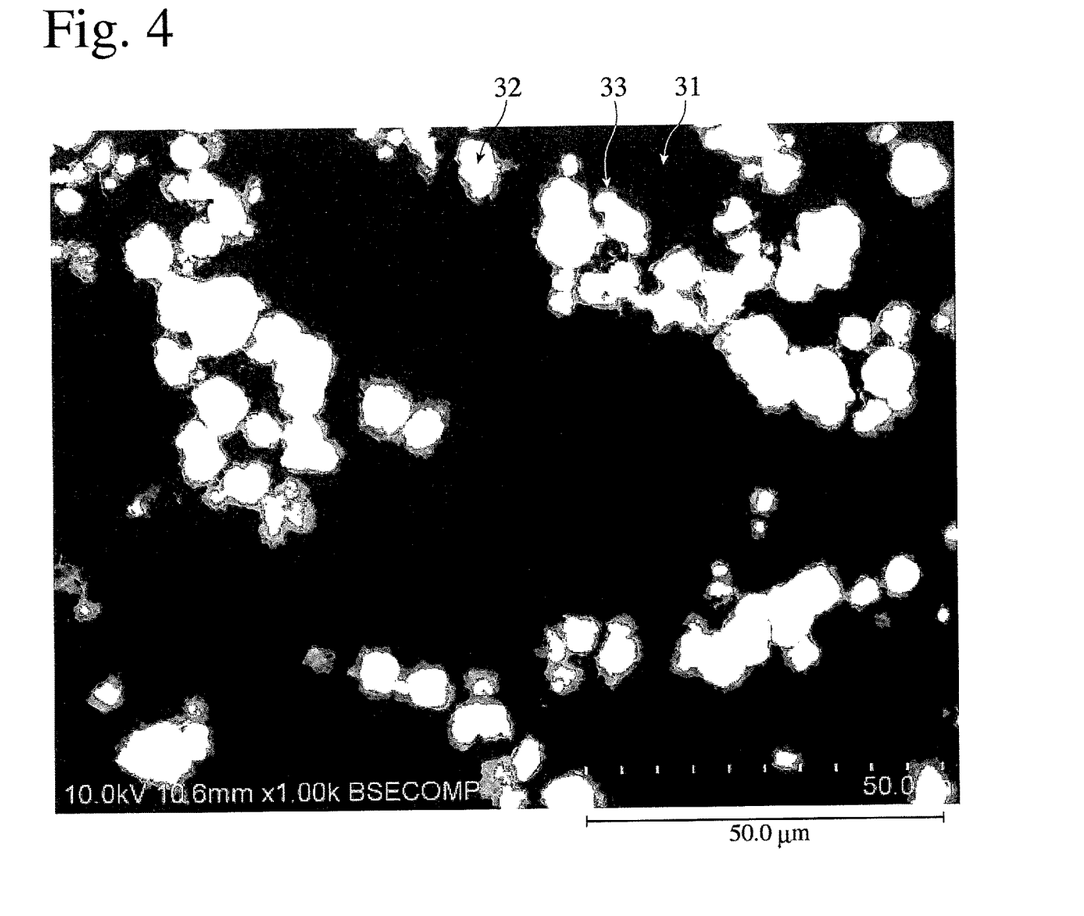
FIG. 4 is an electron photomicrograph showing a cross section of the lining layer of the molding machine cylinder of Comparative Example 1.
Figure 5:
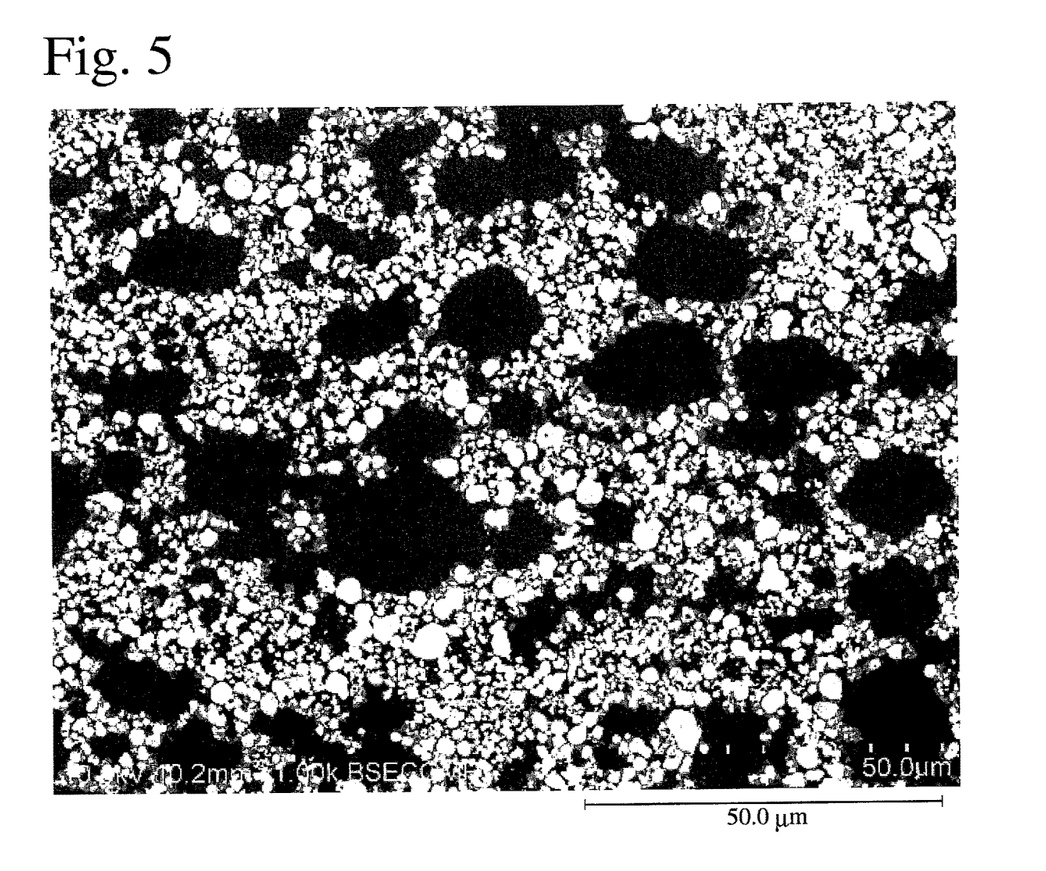
FIG. 5 is an electron photomicrograph showing a cross section of the lining layer of the molding machine cylinder of Comparative Example 2.

As shown in FIG. 4, for example, the lining layer 3 obtained by HIP-sintering Ni-based alloy powder and tungsten carbide powder has a structure in which gaps between tungsten carbide particles (white portions) 32 are filled with a matrix composed of an Ni-based alloy 31 (black portions). In the figure, there are gray portions (boundary phases 33) adjacent to the tungsten carbide particles 32. The boundary phases 33 having an intermediate composition between those of the Ni-based alloy 31 and the tungsten carbide particles 32 are presumably formed by their reaction. The lining layer 3 in the molding machine cylinder of the present invention should have a structure in which "the maximum length of the matrix" determined on a SEM photograph of its cross section by a method described below is 12 μm or less. When the maximum length of the matrix is more than 12 μm, as described above, the lining layer 3 has low mechanical strength as well as poor wear resistance and corrosion resistance. The maximum length of the matrix is preferably 10 or less, further preferably 8 μm or less, most preferably 6 μm or less.

Figure 6:
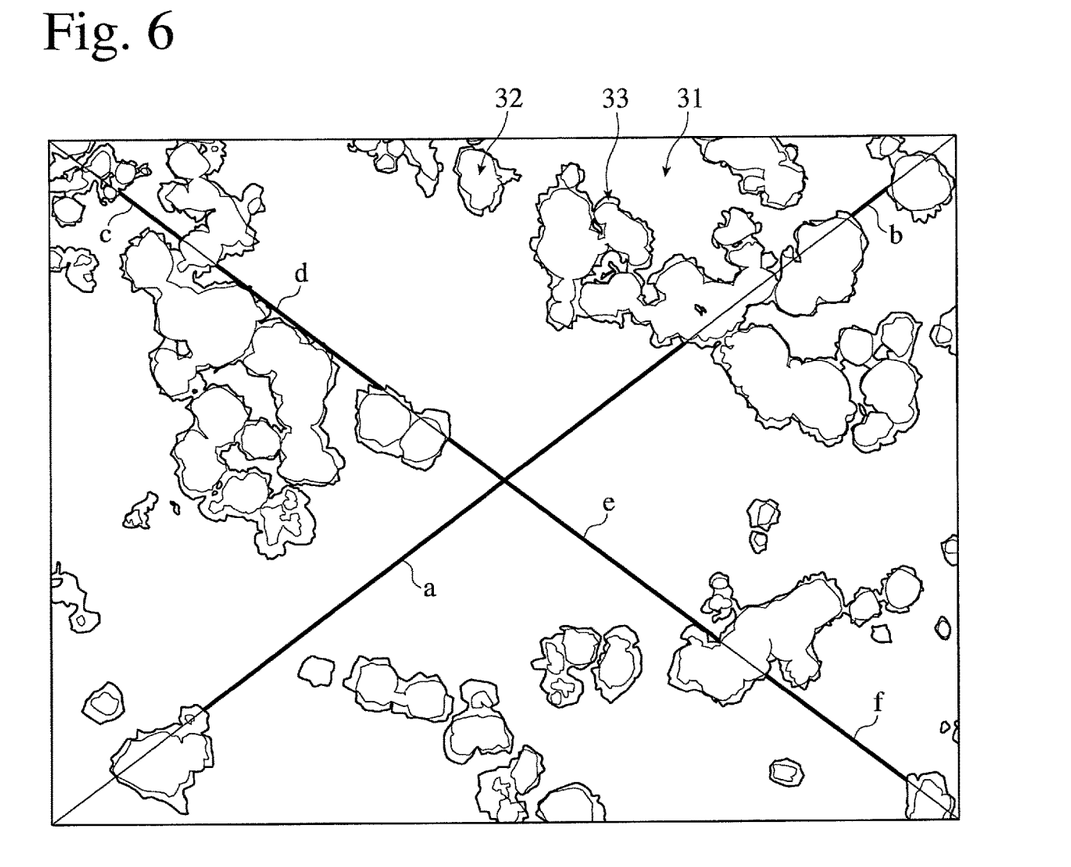
FIG. 6 is a schematic view for explaining a method for measuring the maximum length of a matrix in the lining layer.

As shown in FIG. 6, "the maximum length of the matrix" is determined by drawing two diagonal lines on a SEM photograph of each field (field area: 127 μm×94 μm) taken at a magnification of about 1000 times (acceleration voltage: 10.0 kV), measuring the lengths of line segments of each diagonal line crossing matrix regions composed of the Ni-based alloy 31 with no tungsten carbide particles 32 and no boundary phases 33, selecting the maximum length in each field, and averaging the maximum lengths in 10 fields. For example, in FIG. 6 schematically showing the SEM photograph of Comparative Example 1, the longest line segment "a" among line segments "a" to "f" (only six long line segments are shown in the figure), in which two diagonal lines cross matrix regions, is selected, and the longest line segments in 10 fields are averaged to determine the maximum length of the matrix.

Comprising 38-70% by volume of tungsten carbide particles having a median diameter $d_{50}$ of 1-7 μm and the matrix composed of the Ni-based alloy, with a structure in which "the maximum length of the matrix" is 12 μm or less, the lining layer of the present invention exhibits excellent wear resistance, corrosion resistance and machinability.

(B) Tungsten Carbide Particles

Comprising 38-70% by volume of relatively small tungsten carbide particles 32 having a median diameter $d_{50}$ of 1-7 μm and the matrix composed of the Ni-based alloy 31, the lining layer 3 has excellent machinability as well as improved wear resistance.

The percentage of the tungsten carbide particles 32 is 38-70% by volume per the total amount of the Ni-based alloy 31 and the tungsten carbide particles 32 constituting the lining layer 3. Less than 38% by volume of tungsten carbide particles 32 insufficiently improves the wear resistance, while more than 70% by volume of tungsten carbide particles 32 undesirably decreases the mechanical strength. The percentage of the tungsten carbide particles 32 is preferably 45% or more by volume, more preferably 50% or more by volume. Also, the percentage of the tungsten carbide particles 32 is preferably 65% or less by volume, more preferably 60% or less by volume.

The tungsten carbide particles 32 has a median diameter $d_{50}$ of 1-7 μm. Uniform dispersion is difficult when it is less than 1 μm, while the lining layer has poor machinability when it is more than 7 μm. The median diameter $d_{50}$ of the tungsten carbide particles 32 is preferably 2 μm or more and 6 μm or less. Because the lining layer is densely filled with interconnected tungsten carbide particles, it is difficult to determine the sizes of WC particles on an electron photomicrograph. Accordingly, used herein as the median diameter $d_{50}$ of the tungsten carbide particles 32 dispersed in the lining layer is that measured on tungsten carbide powder as a raw material by a Microtrac particle size distribution meter 9320-X100 available from Nikkiso Co., Ltd., for example. Because the lining layer in the molding machine cylinder of the present invention is sintered at a relatively low temperature (930-970° C.) by HIP, the particle sizes of tungsten carbide powder as a raw material are substantially not different from those of the tungsten carbide particles in the lining layer. Accordingly, the median diameter $d_{50}$ of the tungsten carbide particles dispersed in the lining layer may be expressed by the median diameter $d_{50}$ of the tungsten carbide powder as a raw material.

The tungsten carbide particles preferably have $d_{10}$ of 0.5-3 μm, and $d_{90}$ of 5-15 μm, wherein $d_{10}$ and $d_{90}$ are particle sizes at cumulative volumes corresponding to 10% and 90%, respectively, of the total volume, in a curve expressing the relation between the particle size and cumulative volume (value obtained by accumulating the volume of particles having sizes up to a particular size) of tungsten carbide particles.

(C) Matrix Composed of Ni-Based Alloy

The matrix composed of the Ni-based alloy 31 constituting the lining layer 3 preferably comprises by mass 1-7% of Si, 5-20% of Cr, 1-4% of B, 1.5% or less of Mn, and 12% or less of Co as indispensable components, the balance being Ni and inevitable impurities.

(a) 1-7% by Mass of Si

Si is dissolved in the matrix composed of the Ni-based alloy 31 in the lining layer 3 to increase its hardness, thereby contributing to improvement in wear resistance. Less than 1% by mass of Si does not sufficiently provide this effect, while more than 7% by mass of Si makes the lining layer 3 brittle. The Si content is more preferably 2% or more by mass, further preferably 2.5% or more by mass, most preferably 2.8% or more by mass. Also, the Si content is more preferably 4% or less by mass, further preferably 3.5% or less by mass, most preferably 3.2% or less by mass.

(b) 5-20% by Mass of Cr

Cr is mainly dissolved in the matrix composed of the Ni-based alloy 31 to increase the strength and corrosion resistance. Less than 5% by mass of Cr unlikely provides the effect of improving the strength and corrosion resistance, while more than 20% by mass of Cr reduces the toughness of the matrix. The Cr content is more preferably 5.5% or more by mass, further preferably 6.5% or more by mass. Also, the Cr content is more preferably 15% or less by mass, further preferably 10% or less by mass, most preferably 8.5% or less by mass.

(c) 1-4% by Mass of B

B is combined with Ni, Cr, etc. to precipitate high-hardness borides in the structure, thereby improving the hardness of the matrix. Less than 1% by mass of B does not provide such effect sufficiently, while more than 4% by mass of B forms excessive borides, lowering the strength of the lining layer. The B content is more preferably 2% or more by mass, further preferably 2.5% or more by mass. Also, the B content is more preferably 3.7% or less by mass, further preferably 3.2% or less by mass.

(d) 1.5% or Less by Mass of Mn

Mn removes undesirable substance such as oxides, etc. in the production of the Ni-based alloy by an atomizing method. More than 1.5% by mass of Mn undesirably deteriorates the corrosion resistance of the lining layer 3. The Mn content is more preferably 0.5% or more by mass, further preferably 0.7% or more by mass. Also, the Mn content is more preferably 1.3% or less by mass, further preferably 1.2% or less by mass.

(e) 12% or Less by Mass of Co

Like Ni, Co imparts corrosion resistance to the lining layer 3, and is dissolved in the matrix to improve its strength. More than 12% by mass of Co is not economical because of the saturation of such effect. The Co content is more preferably 5% or more by mass, further preferably 8% or more by mass. Also, the Co content is more preferably 11.5% or less by mass, further preferably 11% or less by mass.

(f) Inevitable Impurities

The inevitable impurities include C, Fe, etc. C is preferably 0.13% or less by mass, because more than 0.13% by mass of C provides brittleness and low strength to the lining layer. Fe is preferably 0.5% or less by mass, because more than 0.5% by mass of Fe provides low corrosion resistance.

(2) Cylindrical Body

The cylindrical body is preferably formed by high-yield-strength steel, to hold the lining layer strongly and prevent the cracking of the lining layer during molding. Such high-yield-strength steel is preferably carbon steel or microalloyed steel, particularly microalloyed steel.

The carbon steel per se may be known one, and, for example, carbon steel containing 0.25-0.6% by mass of C is preferable. The general composition of such carbon steel comprises 0.25-0.6% by mass of C, 0.15-0.35% by mass of Si, and 0.60-0.90% by mass of Mn, the balance being substantially Fe and inevitable impurities.

Because the microalloyed steel containing alloying elements such as V, etc. has excellent yield strength and toughness without heat treatment (tempering), it can be formed into a composite cylinder at lower cost than steel such as S45C, SCM440, etc. (needing a heat treatment after HIP to obtain sufficient yield strength).

The microalloyed steel for forming a cylindrical body generally has a composition comprising 0.3-0.6% by mass of C, 0.01-1% by mass of Si, 0.1-2% by mass of Mn, and 0.05-0.5% by mass of V, the balance being substantially Fe and inevitable impurities. The microalloyed steel may further contain as optional elements at least one selected from the group consisting of 0.01-1% by mass of Cr, 0.01-1% by mass of Cu, and 0.01-1% by mass of Nb.

[2] Production Method

The method of the present invention for producing the molding machine cylinder comprises the steps of (a) arranging a steel mandrel inside a cylindrical steel body to form a space between an inner surface of the cylindrical body and the mandrel;

(b) filling the space with a powdery mixture comprising tungsten carbide powder and Ni-based alloy powder at a volume ratio of 38/62 to 70/30;

(c) evacuating and sealing the space containing the powdery mixture, and then subjecting the powdery mixture to HIP, to obtain a composite cylinder having a lining of the Ni-based alloy containing tungsten carbide particles on an inner surface of the cylindrical body (HIP process); and (d) machining the resultant composite cylinder;

the tungsten carbide powder having a median diameter $d_{50}$ of 1-7 μm and $d_{50}/(d_{90}-d_{10})$ of 0.4 or more; and the Ni-based alloy powder having a median diameter $d_{50}$ of 2-8 μm, and $d_{50}/(d_{90}-d_{10})$ of 0.6 or more.

The method of the present invention can produce a molding machine cylinder having a HIP-sintered lining layer on an inner surface of a cylindrical steel body, the sintered lining layer comprising 38-70% by volume of tungsten carbide particles having a median diameter $d_{50}$ of 1-7 μm and the matrix composed of the Ni-based alloy, and the maximum length of the matrix in an arbitrary cross section being 12 μm or less.

(a) Formation of Space

Figure 7:
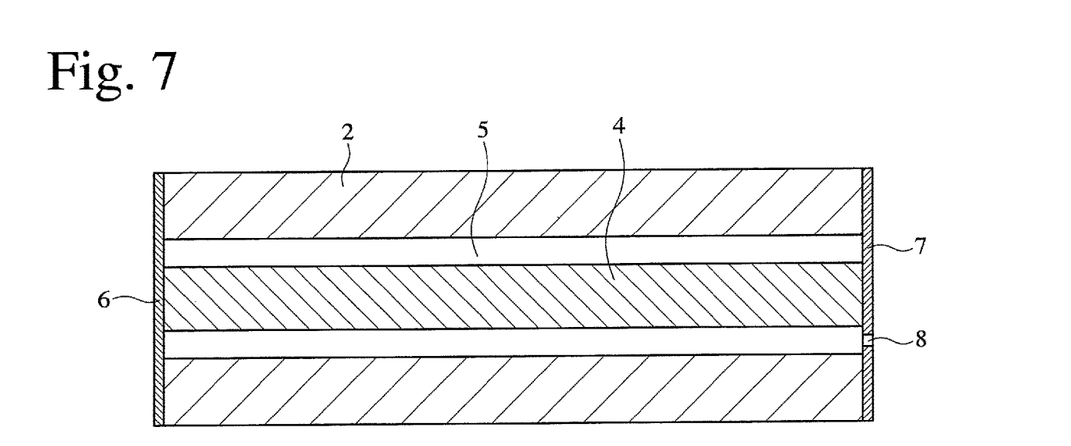
FIG. 7 is a schematic cross-sectional view showing a mandrel inserted into the cylindrical body.

As shown in FIG. 7, the steel mandrel 4 is placed inside the cylindrical steel body 2 to form an annular space 5 between the cylindrical body 2 and the mandrel 4, in which the lining layer 3 of the molding machine cylinder 1 is molded. A lid 6 is welded to one-side ends of the mandrel 4 and the cylindrical body 2. The mandrel 4 may be a solid or hollow cylinder. The mandrel 4 and the lids 6, 7 can be formed by soft steel, etc.

(b) Charging of Powdery Mixture (i) Preparation of Powdery Mixture

The tungsten carbide powder and the Ni-based alloy powder are prepared. The tungsten carbide powder used has a median diameter $d_{50}$ of 1-7 μm. When the median diameter is less than 1 the uniform mixing of the tungsten carbide powder with the Ni-based alloy powder is difficult, and the material cost is high. When the median diameter is more than 7 the resultant lining layer has poor machinability. The median diameter $d_{50}$ of the tungsten carbide powder is preferably 2 μm or more and 6 μm or less. The tungsten carbide powder preferably has $d_{10}$ of 0.5-3 μm and $d_{90}$ of 5-15 μm. The tungsten carbide powder used has $d_{50}/(d_{90}-d_{10})$ of 0.4 or more. The value of $d_{50}/(d_{90}-d_{10})$ is an index indicating the particle size distribution. The $d_{50}/(d_{90}-d_{10})$ of 0.4 or more provides a sharp particle size distribution, resulting in a lining layer excellent in both wear resistance and machinability. The $d_{50}/(d_{90}-d_{10})$ of the tungsten carbide powder is preferably 0.5 or more, more preferably 0.6 or more.

The Ni-based alloy powder used has a matrix composition comprising by mass 1-7% of Si, 5-20% of Cr, 1-4% of B, 1.5% or less of Mn, and 12% or less of Co as indispensable components, the balance being Ni and inevitable impurities, and a median diameter $d_{50}$ of 2-8 μm. When the median diameter is less than 2 μm, its uniform mixing with the tungsten carbide powder is difficult, and the material cost is high. When the median diameter is more than 8 the resultant lining layer has the maximum length of the matrix exceeding 12 μm, exhibiting poor wear resistance and corrosion resistance. The Ni-based alloy powder preferably has a median diameter $d_{50}$ of 6 μm or less. The Ni-based alloy powder preferably has $d_{10}$ of 1-5 μm and $d_{90}$ of 6-12. The Ni-based alloy powder used has $d_{50}/(d_{90}-d_{10})$ of 0.6 or more. The value of $d_{50}/(d_{90}-d_{10})$ is an index indicating the particle size distribution. The $d_{50}/(d_{90}-d_{10})$ of 0.6 or more provides a sharp particle size distribution, leading to easy uniform mixing of the tungsten carbide powder having a sharp particle size distribution and the Ni-based alloy powder, thereby providing a lining layer having a structure in which the tungsten carbide particles are uniformly dispersed in the matrix composed of the Ni-based alloy. The $d_{50}/(d_{90}-d_{10})$ of the Ni-based alloy powder is preferably 0.8 or more, more preferably 0.9 or more.

The Ni-based alloy powder is preferably produced by atomizing a molten Ni-based alloy. Because the atomized Ni-based alloy powder is substantially spherical, having good flowability, it can be uniformly mixed with the tungsten carbide powder. A gas atomizing method and a water atomizing method can be used for atomizing, and the water atomizing method is preferable.

The $d_{50}$ (median diameter), $d_{10}$ and $d_{90}$ of the tungsten carbide powder and the Ni-based alloy powder can be determined from their particle size distributions measured, for example, by a Microtrac particle size distribution meter 9320-X100 available from Nikkiso Co., Ltd. The $d_{50}$ (median diameter), $d_{10}$ and $d_{90}$ are particle sizes at cumulative volumes corresponding to 50%, 10% and 90%, respectively, of the total volume, in a curve expressing the relation between the particle size and cumulative volume (value obtained by accumulating the volume of particles having sizes up to a particular size) of powder.

After weighing the tungsten carbide powder and the Ni-based alloy powder to a volume ratio of 38/62 to 70/30 (38-70% by volume as a ratio of the tungsten carbide powder), they are dry-mixed. The weight of each powder is measured, and converted to a volume ratio using the specific gravities of the tungsten carbide and the Ni-based alloy. When the percentage of the tungsten carbide powder in the powdery mixture is less than 38% by volume, the lining layer has insufficient wear resistance. When it is more than 70% by volume, the lining layer has drastically reduced mechanical strength. The percentage of the tungsten carbide powder in the powdery mixture is preferably 45% or more by volume, more preferably 50% or more by volume. Also, the percentage of the tungsten carbide powder in the powdery mixture is preferably 65% or less by volume, more preferably 60% or less by volume.

(ii) Charging of Powdery Mixture

Figure 8:
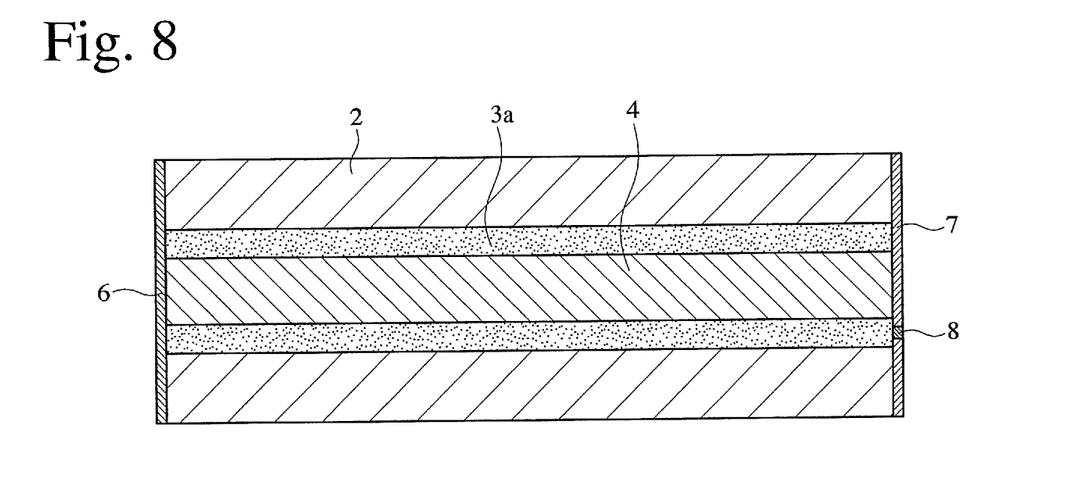
FIG. 8 is a schematic cross-sectional view showing alloy powder for the lining charged into a space between the cylindrical body and the mandrel.

The resultant powdery mixture 3a is charged into the space 5. The charging of the alloy powder is preferably conducted while properly vibrating the cylindrical body 2. After the powdery mixture 3a is charged, a lid 7 having an evacuating aperture 8 is welded to the other ends of the cylindrical body 2 and the mandrel 4.

(c) HIP Treatment

After the space 5 containing the powdery mixture 3a is evacuated, the evacuating aperture 8 of the lid 7 is sealed by welding, and HIP is conducted by a known method. HIP is preferably conducted at 930-970° C. and 100-150 MPa for 1-5 hours in an inert gas atmosphere such as Ar, etc. HIP produces a composite cylinder having a lining layer containing tungsten carbide particles in the matrix composed of the Ni-based alloy, which is integrally bonded to an inner surface of the cylindrical body. The lower limit of the HIP temperature is more preferably 940° C., most preferably 945° C. The upper limit is more preferably 960° C.

(d) Machining

After successively removing the lids 6, 7 and the mandrel 4 from the HIPed composite cylinder by cutting, etc., the inner surface of the cylinder is finished. If necessary, an aperture for a hopper for charging materials is formed in the cylinder.

Because the median diameters and particle size distributions of tungsten carbide powder and Ni-based alloy powder are controlled in the molding machine cylinder thus produced, the lining layer has a structure in which tungsten carbide particles are uniformly dispersed in the matrix composed of the Ni-based alloy, exhibiting high mechanical strength, as well as excellent wear resistance, corrosion resistance and machinability.

EXAMPLES

The present invention will be explained in further detail by Examples, without intention of restricting the present invention thereto.

(1) Preparation of Lining Layer Material

Ni-based alloys A and C having the chemical compositions shown in Table 1-1 were prepared as alloy materials for forming lining layers, and each was atomized to produce Ni-based alloy powders A and C having $d_{50}$ (median diameter), $d_{10}$ and $d_{90}$ shown in Table 1-2. The Ni-based alloy powder A was sieved to less than 25 μm to provide Ni-based alloy powder B. Also, two types of tungsten carbide powders A and B having $d_{50}$ (median diameter), $d_{10}$ and $d_{90}$ shown in Table 2 were prepared.

TABLE 1-1

| Ni-Based Alloy | C | Si | Mn | Cr | Co | Fe | B | Ni |
|---|---|---|---|---|---|---|---|---|
| A | 0.06 | 2.93 | 0.9 | 7.46 | 9.96 | 0.17 | 2.9 | Bal. |
| C | 0.05 | 2.91 | 1 | 7.5 | 9.95 | 0.18 | 2.8 | Bal. |

Note:
The unit is % by mass. The Ni-based alloys A and C contained inevitable impurities.

TABLE 1-2

| Ni-Based Alloy Powder | Median Diameter $d_{50}$ | $d_{10}$ | $d_{90}$ | $d_{50}/(d_{90} - d_{10})$ |
|---|---|---|---|---|
| A | 42.9 μm | 16.2 μm | 66.1 μm | 0.86 |
| B | 14.2 μm | 6.4 μm | 19.8 μm | 1.06 |
| C | 5 μm | 2.7 μm | 7.8 μm | 0.98 |

TABLE 2

| Tungsten Carbide Powder | Median Diameter $d_{50}$ | $d_{10}$ | $d_{90}$ | $d_{50}/(d_{90} - d_{10})$ |
|---|---|---|---|---|
| A | 14.6 μm | 7.7 μm | 125.2 μm | 0.12 |
| B | 4.1 μm | 2.0 μm | 8.2 μm | 0.66 |

(2) Production of Cylinder for Molding Machine

Example 1

As shown in FIG. 7, a solid cylindrical SUS304 mandrel 4 of 24 mm in outer diameter for forming a lining layer 3 of a molding machine cylinder 1 was inserted into a cylindrical body 2 of 120 mm in outer diameter, 36 mm in inner diameter and 840 mm in length, which was made of microalloyed steel having a composition comprising 0.48% by mass of C, 0.2% by mass of Si, 1.3% by mass of Mn, 0.02% by mass of P, 0.05% by mass of S, 0.2% by mass of Cr, and 0.2% by mass of V, the balance being Fe and inevitable impurities. A lid 6 made of the same material as that of the mandrel 4 was welded to one-side ends of the mandrel 4 and the cylindrical body 2, to form an annular space 5 between the cylindrical body 2 and the mandrel 4. The materials and shapes of the cylindrical body 2 and the mandrel 4 are shown in Table 3.

The Ni-based alloy powder C and the tungsten carbide powder B were obtained at a mass ratio corresponding to 60% by volume of the Ni-based alloy powder to 40% by volume of the tungsten carbide powder, using the specific gravities of 8 for the Ni-based alloy and 15.6 for the tungsten carbide in the conversion of the volume ratio to the mass ratio. These powders were dry-mixed by a mixer, and the resultant powdery mixture 3a was charged into the space 5. After the powdery mixture 3a was charged, a lid 7 having an evacuating aperture 8 was welded to the other ends of the cylindrical body 2 and the mandrel 4. The space 5 containing the powdery mixture 3a was evacuated through the evacuating aperture 8, and the evacuating aperture 8 was sealed by welding. The sealed cylinder containing the powdery mixture 3a was placed in a HIP apparatus to conduct HIP at 950° C. and 132.7 MPa for 4 hours in an Ar gas atmosphere. After the lids 6, 7 and the mandrel 4 were successively removed from the HIPed composite cylinder by cutting, etc., the inner surface of the cylinder was finish-machined to obtain a molding machine cylinder (outer diameter: 90 mm, inner diameter: 28 mm, and length: 706 mm) having a 2.2-mm-thick lining layer of a Ni-based alloy containing tungsten carbide particles on the inner surface of the cylindrical body. The types and amounts of the Ni-based alloy powder and the tungsten carbide powder used and the sizes of the machined cylinders for molding machines are shown in Table 4.

Example 2

A molding machine cylinder (outer diameter: 90 mm, inner diameter: 28 mm, and length: 706 mm) having a 2.1-mm-thick lining layer of a Ni-based alloy containing tungsten carbide particles on an inner surface of a cylindrical body was produced in the same manner as in Example 1, except for changing the types and amounts of the Ni-based alloy powder and the tungsten carbide powder as shown in Table 4.

Comparative Example 1

A molding machine cylinder (outer diameter: 90 mm, inner diameter: 32 mm, and length: 851 mm) having a 2.3-mm-thick lining layer of a Ni-based alloy containing tungsten carbide particles on an inner surface of a cylindrical body was produced in the same manner as in Example 1, except for changing the cylindrical body and the mandrel as shown in Table 3, and the types and amounts of the Ni-based alloy powder and the tungsten carbide powder as shown in Table 4.

Comparative Example 2

A molding machine cylinder (outer diameter: 94 mm, inner diameter: 32 mm, and length: 859 mm) having a 1.9-mm-thick lining layer of a Ni-based alloy containing tungsten carbide particles on an inner surface of a cylindrical body was produced in the same manner as in Example 1, except for changing the cylindrical body and the mandrel as shown in Table 3, the types and amounts of the Ni-based alloy powder and the tungsten carbide powder as shown in Table 4, and further the HIP time to 2 hours.

TABLE 3

| | Cylindrical Body | | | Mandrel | |
|---|---|---|---|---|---|
| No. | Material | Outer Diameter | Inner Diameter | Length | Material | Outer Diameter |
| Example 1 | Microalloyed Steel | 120 | 36 | 840 | SUS304 | 24 |
| Example 2 | Microalloyed Steel | 120 | 36 | 840 | SUS304 | 24 |
| Com. Ex. 1 | Microalloyed Steel | 100 | 40 | 890 | SS400 | 28 |
| Com. Ex. 2 | Microalloyed Steel | 100 | 40 | 920 | SUS304 | 31 |

TABLE 4

| | Ni-Based Alloy Powder | | Tungsten Carbide Powder | | Shape of Cylinder for Molding Machine | | | |
|---|---|---|---|---|---|---|---|---|
| | | | | | Outer Diameter (mm) | Inner Diameter (mm) | Length (mm) | Thickness of Lining Layer (mm) |
| No. | Type | Vol. % | Type | Vol. % | | | | |
| Example 1 | C | 60 | B | 40 | 90 | 28 | 706 | 2.2 |
| Example 2 | C | 45 | B | 55 | 90 | 28 | 706 | 2.1 |
| Com. Ex. 1 | A | 80 | A | 20 | 90 | 32 | 851 | 2.3 |
| Com. Ex. 2 | B | 60 | B | 40 | 94 | 32 | 859 | 1.9 |

(3) Evaluation of Lining Layer

A measurement sample was cut out of an end portion of the lining layer of the HIPed composite cylinder, to evaluate the maximum length of the matrix, and the mechanical strength, wear resistance, corrosion resistance and machinability of the lining layer in the molding machine cylinder, by methods described below.

(i) Maximum Length of Matrix

Diagonal lines were drawn on a SEM photograph of each field (field area: 127 μm×94 μm) of a cross section of the lining layer taken at magnification of about 1000 times (acceleration voltage: 10.0 kV), and the lengths of line segments of each diagonal line crossing matrix regions composed of the Ni-based alloy 31 with no tungsten carbide particles 32 and no boundary phases 33 were measured. The maximum length in each field was selected, and the maximum lengths of the matrix in 10 fields were averaged (see FIG. 6). The SEM photographs of cross sections of the linings of Examples 1 and 2, and Comparative Examples 1 and 2 are shown in FIGS. 2-5. In the figures, black portions are the matrix regions composed of the Ni-based alloy 31, white portions are the tungsten carbide particles 32, and gray portions adjacent to the tungsten carbide particles 32 are the boundary phases 33.

(ii) Mechanical Strength

The mechanical strength was evaluated by bending strength measured by a four-point bending test of each cut-out measurement sample having 0.1-C-chamfered longitudinal edges (thickness: 1.5 mm, width: 4.0 mm, and length: 40 mm), at an upper inter-fulcrum distance of 10 mm, a lower inter-fulcrum distance of 30 mm, and a test speed of 0.2 mm/min.

(iii) Wear Resistance

A round rod test piece of 10 mm in diameter and 15 mm in length was cut out of an end portion of the HIPed composite cylinder, such that the lining layer existed in one end surface. The end surface having the lining layer was finished by grinding. While rotating this test piece around its center axis at 150 rpm, the lining-layer-existing end surface was pressed to a #1500 grinder paper at a load of 90 N for 3 minutes two times, and the wear weight of the test piece was measured. The wear weight was divided by a test surface area to determine the amount of wear.

(vi) Corrosion Resistance

Test pieces (20 mm×4 mm×1.5 mm) were cut out of an end portion of the lining layer of the HIPed composite cylinder. These test pieces were immersed in an 18-% aqueous hydrochloric acid solution at 50° C. and a 10-% aqueous nitric acid solution at 50° C. each for 24 hours, to measure their weight loss by corrosion.

(v) Machinability

Using a vertical honing machine (FVG-1500SA available from Fuji Honing Industrial Co., Ltd.), a honing head having four diamond grinders (4 mm×4 mm×100 mm; and abrasive size: #100) circumferentially arranged at circumferential intervals of 90° was rotated at 100 rpm, and inserted into the HIPed composite cylinder from which the mandrel was removed by machining, such that it came into surface contact with the inner surface of the composite cylinder at an expansion pressure of 0.3 MPa. The honing head reciprocated longitudinally 10 times over the entire length of the cylinder to measure the amount of grinding the inner surface.

TABLE 5

| No. | Maximum Length of Matrix (μm) | Bending Strength (MPa) | Wear Resistance [1] (mg/cm²) | Corrosion Resistance [2] (mg/cm²) | | Machinability [3] (mg) |
|---|---|---|---|---|---|---|
| | | | | 18-% Hydrochloric Acid | 10-% Nitric Acid | |
| Example 1 | 11.4 | 1015 | 2.5 | 43.4 | 174.0 | 0.04 |
| Example 2 | 6.0 | 1009 | 0.8 | 28.0 | 93.5 | 0.03 |
| Com. Ex. 1 | 58.9 | 683 | 15.5 | 33.7 | 178.6 | 0.007 |
| Com. Ex. 2 | 22.8 | — | 4.5 | 21.5 | 150.6 | 0.04 |

Note:
[1] The wear resistance is expressed by the amount of wear per area after the wear test.
[2] The corrosion resistance is expressed by weight loss by corrosion per area after immersion in each corrosion solution at 50° C. for 24 hours.
[3] The machinability is expressed by the amount of wear after the honing test.

It is clear from Table 5 that the molding machine cylinders of Examples 1 and 2 each having a lining layer comprising 38-70% by volume of tungsten carbide particles having a median diameter $d_{50}$ of 1-7 μm and the matrix composed of the Ni-based alloy, the maximum length of the matrix in an arbitrary cross section being 12 μm or less, had excellent mechanical strength (bending strength), wear resistance and corrosion resistance, as well as excellent machinability.

Because the molding machine cylinder of Comparative Example 1 contained 20% by volume of tungsten carbide particles having a median diameter of 14.6 μm, it exhibited extremely poorer mechanical strength (bending strength), wear resistance and machinability than those of Examples 1 and 2.

Though the molding machine cylinder of Comparative Example 2 met the requirement of the present invention of containing 40% by volume tungsten carbide particles having a median diameter of 4.1 μm, it failed to meet the requirement of the present invention in that the matrix had the maximum length of 19.9 μm, exhibiting poorer wear resistance than those of Examples 1 and 2.

It was confirmed that a glass-fiber-containing polyamide resin was able to be molded by the molding machine cylinder of Example 2 without causing any troubles.

What is claimed is:

1. A cylinder for a molding machine comprising a HIP-sintered lining layer on an inner surface of a cylindrical steel body;
    said lining layer comprising 38-70% by volume of tungsten carbide particles having a median diameter $d_{50}$ of 1-7 μm and a matrix composed of an Ni-based alloy;
    said lining layer having a structure in which the tungsten carbide particles are uniformly dispersed in the matrix composed of the Ni-based alloy; and
    the maximum length of said matrix in an arbitrary cross section being 12 μm or less,
    wherein the maximum length of said matrix is determined by drawing two diagonal lines on a SEM photograph taken at a magnification of about 1000 times, measuring the lengths of line segments of each diagonal line crossing matrix regions composed of the Ni-based alloy with no tungsten carbide particles and no boundary phases, and averaging the maximum lengths in 10 fields, wherein the SEM photograph has a field area of 127 μm×94 μm and is obtained by using an acceleration voltage of 10.0 kV, and
    wherein said matrix composed of an Ni-based alloy comprises by mass 1-7% of Si, 5-20% of Cr, 1-4% of B, 0.5-1.5% of Mn, 12% or less of Co, and inevitable impurities.

2. The cylinder for a molding machine according to claim 1, wherein said tungsten carbide particles have $d_{10}$ of 0.5-3 μm and $d_{90}$ of 5-15 μm, wherein $d_{10}$ and $d_{90}$ are particle sizes at cumulative volumes corresponding to 10% and 90%, respectively, of the total volume, in a curve expressing the relation between the particle size and cumulative volume of said tungsten carbide particles,
    wherein the cumulative volume is obtained by accumulating the volume of particles having sizes up to a particular size.

3. The cylinder for a molding machine according to claim 1, wherein said lining layer contains 45-60% by volume of said tungsten carbide particles.

4. A method for producing the cylinder for a molding machine recited in claim 1, comprising the steps of
    arranging a steel mandrel inside a cylindrical steel body to form a space between an inner surface of said cylindrical body and said mandrel;
    filling said space with a powdery mixture comprising tungsten carbide powder and Ni-based alloy powder at a volume ratio of 38/62 to 70/30;
    evacuating and sealing said space containing said powdery mixture, and then subjecting said powdery mixture to HIP to obtain a composite cylinder whose cylindrical body is lined with a Ni-based alloy containing tungsten carbide particles; and
    machining said composite cylinder;
    said tungsten carbide powder having a median diameter $d_{50}$ of 1-7 μm, and $d_{50}/(d_{90}-d_{10})$ of 0.4 or more; and
    said Ni-based alloy powder having a median diameter $d_{50}$ of 2-8 μm, and $d_{50}/(d_{90}-d_{10})$ of 0.6 or more.

* * * * *